Patented May 25, 1954

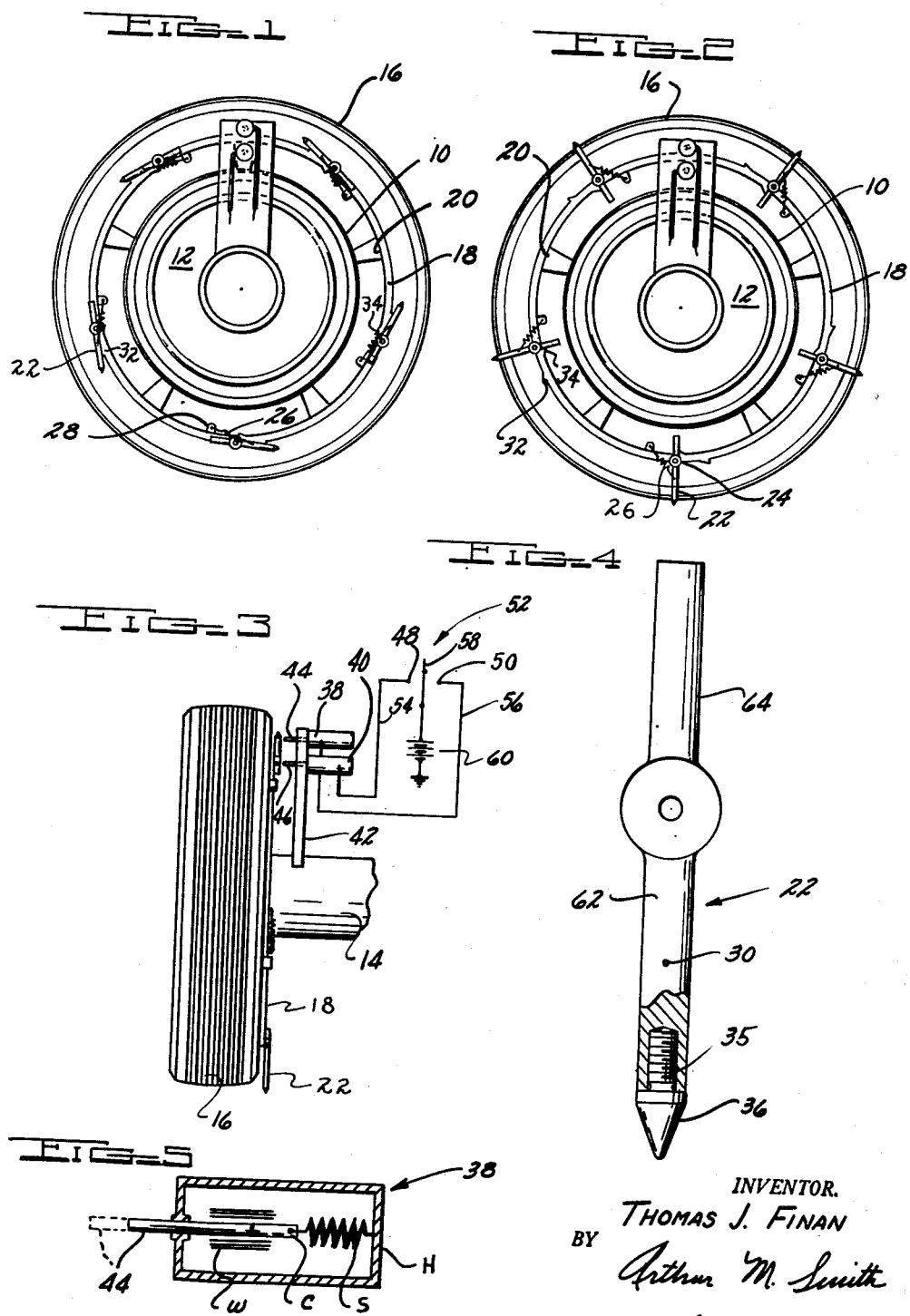

2,679,435

UNITED STATES PATENT OFFICE 2,679,435

TRACTION DEVICE

Thomas J. Finan, St. Clair Shores, Mich.

Application August 6, 1952, Serial No. 302,907

3 Claims. (Cl. 301—45)

The present invention relates to a traction device and more particularly to a traction device adapted to provide increased traction for vehicle wheels instantaneously upon actuation of a control which is located at a point remote from said wheels.

The problem of rapidly and efficiently providing increased traction in vehicle wheels is a problem which has long existed. For instance, trucks have often partially ascended a hill and suddenly encounter an area which is coated with ice. At this point the driver finds that there is insufficient traction to take the truck on up to the peak of the hill. The result is that the truck must descend back down the hill. Such descent is practically uncontrollable on a slippery surface, and jack-knifing of tractor-trailer combinations is not uncommon. Often the uncontrolled descent results in shifting of loads and overturning of the vehicle with consequent danger to driver and cargo. Devices have been developed in the past which attempt to utilize spikes or spurs that will extend outward past the periphery of the vehicle wheel to engage the surface being traveled. Such constructions have proven unsuccessful and impractical. Generally there has been no successful means developed which will support the spikes in the operative position. Further, the apparatus used for actuating the spikes into the operative or inoperative position has been unsatisfactory. It will be realized that if a vehicle is climbing a hill and suddenly hits an icy surface, the increased traction must be provided immediately in order to serve the purpose. Therefore, a construction has been sought which would effectively provide the necessary traction immediately upon discovery of the requirement for traction.

In view of the foregoing problems, it is a principal object of the present invention to provide a simple and sturdy traction device particularly adapted for vehicle wheels.

It is another object of the present invention to provide a traction device for vehicle wheels which can be operated at a point remote from the vehicle wheels and preferably from a point adjacent the driver's seat.

It is another object of the present invention to provide a traction device for vehicle wheels which is efficient in operation and wherein the portions most readily susceptible to wear can be quickly and easily replaced without disassembling the entire device.

Other objects of this invention will appear in the following description and appended claims, reference being had to the accompanying drawings forming a part of this specification wherein like reference characters designate corresponding parts in the several views.

In the drawings:

Figure 1 is a side elevation of a vehicle wheel embodying the traction device of the present invention and viewed from a point on the axle housing of the vehicle, the traction device being shown in the inoperative position, Figure 2 is a side elevation similar to that of Fig. 1 but showing the traction device of the present invention in the operative position, Figure 3 is a front elevation of the wheel shown in Figure 2, Figure 4 is an enlarged view of one of the traction spurs used in the traction device of the present invention, a portion being broken away to reveal the internal construction, Figure 5 is a general detail view of one of the solenoids used with the present invention.

Before explaining the present invention in detail, it is to be understood that the invention is not limited in its application to the details of construction and arrangement of parts illustrated in the accompanying drawings, since the invention is capable of other embodiments and of being practiced or carried out in various ways. Also, it is to be understood that the phraseology or terminology employed herein is for the purpose of description and not of limitation.

A preferred embodiment of the present invention is shown in the drawings wherein the numeral 10 indicates generally the wheel of a vehicle. The wheel 10 includes the brakedrum 12 and is disposed adjacent the axle housing 14. A tire 16 is positioned on the wheel 10. A ring 18 of a diameter larger than the wheel 10 and smaller than the outer diameter of the tire 16 is affixed to the wheel 10 by suitable brackets 20. A plurality of spurs 22 are pivotally connected at spaced points 24 to the ring 18. The construction relating to each spur 22 is identical, so the discussion pertaining to a single spur may be considered as applying to all the spurs.

Each spur 22 is held in the inoperative position of Fig. 1 and the operative position of Fig. 2 by an off-center spring 26 which is disposed between a lug 28 formed on the ring 18 and a hole 30 in the side of the spur 22. The operative and inoperative positions of the spur 22 are beyond the dead center line extending between the pivot point 24 and the point of connection of the spring 26 and the lug 28. Thus the spring 26 will tend to hold the spur 22 in the selected position once the spur passes the dead center position.

In order that the spur 22 may be properly supported in the selected position, two stops 32 and 34 are provided on the ring 18 adjacent the spur 22. Referring to Fig. 1 of the drawings, it will be seen that the stop 32 supports the spur 22 in the inoperative position. The spur 22 is supported in the operative position by the stop 34 as shown in Fig. 2 of the drawings.

Each spur 22 is provided with a threaded opening 35 at the outer end thereof, and a tempered steel tip 36 having a threaded shank thereon is disposed at the end of each of said spurs. Thus, when one tip 36 becomes worn it is a simple and easy matter to replace the worn tip with a new one by unscrewing the old tip and screwing in a new one. Since the other component parts of the traction device are simple in construction and positive in operation, they will not readily become worn. The tips are the only portions which may be in need of periodic replacement.

The means for actuating the traction device comprises a pair of solenoids 38 and 40 which are disposed on a bracket 42 attached by any suitable means to the axle housing 14. The solenoids operate in the conventional manner and their internal construction is well known. Disposed in the solenoids 38 and 40 are the actuating fingers 44 and 46, respectively. The actuating fingers 44 and 46 are normally in the inoperative position shown in Fig. 3 of the drawings.

Referring to Fig. 5 of the drawings, one of the solenoids, for example 38, is shown in detail. A spring S is affixed to the end of the housing H and to one end of a core member C. The core member C is affixed in alignment with the finger 44. The spring S ordinarily holds the core member C and finger 44 in the solid line position. However, when the coil W is energized, the core C is pulled into the coil in the conventional manner and the finger 44 is moved to the dotted line position.

The solenoids 40 and 38 are electrically connected to the contacts 48 and 50 of a switch, generally designated at 52, by the wires 54 and 56 respectively. The switch is preferably located adjacent the driver of the vehicle for convenience. The neutral position of the switch arm 58 is designated in Fig. 3 of the drawings, and the switch is coupled with a source of electrical energy such as the battery 60.

In normal operation of the vehicle, the switch arm 58 is in the neutral position shown in Fig. 3 of the drawings and the spurs 22 are in the inoperative position also shown in Fig. 1 of the drawings. When it is desired to move the spurs 22 to the operative position shown in Fig. 2 of the drawings, the driver of the vehicle moves the switch arm 58 to the right until it engages the contact 50 of the switch 52. It will be noted that this closes the circuit between the battery 60 and the solenoid 38 to energize the coil of the solenoid 38. The energizing of the coil of the solenoid 38 moves the core and finger 44 in the usual manner as previously explained so that the finger is moved out of the solenoid 38. When this happens the finger 44 protrudes into the path of rotation of the long shanks 62 of the spurs 22 and engages the long shank 62 of each spur 22 as the same passes the said finger 44. The finger 44 thus flips each spur 22 into the operative position shown in Fig. 2 of the drawings and the spur 22 engages the stop 34. After the spur passes the dead center line of the spring 26, the spring 26 has a tendency to move the spur 22 into the operative position and supplements the action of the finger 44. The finger 44 has an end portion which is formed of a resilient material such as spring steel so that as each spur is moved into engagement against the stop 34, the end of the finger 44 will bend around the spur and engage the next spur 22. In this manner, all the spurs 22 are moved to the operative position at which time the switch arm 58 is again moved to the neutral position shown in Fig. 3. As the switch arm 58 is moved to the neutral position, the circuit between the battery 60 and the solenoid 38 is broken and finger 44 is retracted again into the solenoid 38 to the inoperative position shown in Fig. 3.

When it is desired to return the spurs 22 to the inoperative position, the switch arm is moved to the left until it engages the contact 48. This closes the circuit between the battery 60 and the solenoid 40. The coil of the solenoid 40 is energized and the finger 46 is moved out of the solenoid and into the path of rotation of the short shanks 64 of the spurs 22. As the shank 64 of each spur 22 is engaged the spur is moved to the inoperative position of Fig. 1. As the spur 22 pivots past the dead center position of the spring 26, the spring aids in returning the spur to the inoperative position. The end portion of the finger 46 is also resilient and once the first spur 22 is moved into the inoperative poistion against the stop 30, the resilient finger 46 will move past the first spur and engage the short shank 64 of the next spur and so on until all the spurs are in the inoperative position. After all the spurs 22 are returned to the inoperative position, the switch arm 58 is again returned to the neutral position shown in Fig. 3. This opens the circuit between the battery 60 and the solenoid 40, and the finger 46 is retracted back into the solenoid 40.

The spurs 22 are maintained in the operative position by means of the springs 26 and also by centrifugal force which tends to force the spurs 22 against the stops 32 when the vehicle wheel is rotated in a forward direction. Thus, the spurs will readily maintain the operative position without difficulty.

From the foregoing description, it will be seen that I have provided a simple and efficient traction device for vehicle wheels which can be controlled by an electrical switch conveniently located at the driver's position.

Having thus described my invention, I claim:

1. In combination with a vehicle wheel disposed on the end of an axle housing, a traction device comprising a ring coaxially affixed to said wheel, a plurality of substantially straight smooth traction spurs pivotally disposed at spaced points on said ring, a bracket affixed to the vehicle axle housing and having a pair of electrical actuating mechanisms disposed thereon, a pair of fingers protruding one from each of said actuating mechanisms, a pair of resilient contact portions one formed on the end of each of said fingers, one of said contact portions being selectively movable into the path of said spurs on one side of the pivot points to directly engage said spurs and rotate the spurs about the pivot points into the operative position, and the other of said contact portions being selectively movable into the path of said spurs on the other side of the pivot points to directly engage said spurs and rotate the spurs about the pivot points into the inoperative position, and an electric switch positioned remote from the traction device for selectively actuating the electrical actuating mechanisms to control the fingers.

2. In combination with a vehicle wheel disposed on the end of an axle housing, a traction device comprising a ring coaxially affixed to said wheel, a plurality of substantially straight smooth traction spurs pivotally disposed at spaced points on said ring, a plurality of springs positioned one in off center arrangement between said ring and each of said spurs, a bracket affixed to the vehicle axle housing and having a pair of electrical actuating mechanisms disposed thereon, a pair of fingers protruding one from each of said actuating mechanisms, a pair of resilient contact portions one formed on the end of each of said fingers, one of said contact portions being selectively movable into the path of said spurs on one side of the pivot points to directly engage said spurs and rotate the spurs about the pivot points into the operative position, and the other of said contact portions being selectively movable into the path of said spurs on the other side of the pivot points to directly engage said spurs and rotate the spurs about the pivot points into the inoperative position, and an electric switch positioned remote from the traction device for selectively actuating the electrical actuating mechanisms to control the fingers.

3. In combination with a vehicle wheel disposed on the end of an axle housing, a traction device comprising a ring coaxially affixed to said wheel, a plurality of substantially straight smooth traction spurs pivotally disposed at spaced points on said ring, a plurality of hardened tips one removably disposed on the outer end of each of said spurs, a bracket affixed to the vehicle axle housing and having a pair of electrical actuating mechanisms disposed thereon, a pair of fingers protruding one from each of said actuating mechanisms, a pair of resilient contact portions one formed on the end of each of said fingers, one of said contact portions being selectively movable into the path of said spurs on one side of the pivot points to directly engage said spurs and rotate the spurs about the pivot points into the operative position, and the other of said contact portions being selectively movable into the path of said spurs on the other side of the pivot points to directly engage said spurs and rotate the spurs about the pivot points into the inoperative position, and an electric switch positioned remote from the traction device for selectively actuating the electrical actuating mechanisms to control the fingers.

References Cited in the file of this patent

UNITED STATES PATENTS

| Number | Name | Date |
| --- | --- | --- |
| 622,235 | Johnson | Apr. 4, 1899 |
| 1,141,676 | Young | June 1, 1915 |
| 1,708,353 | Bushemi | Apr. 9, 1929 |